US007352704B1

(12) United States Patent
Toussi et al.

(10) Patent No.: US 7,352,704 B1
(45) Date of Patent: Apr. 1, 2008

(54) METHOD AND APPARATUS FOR MULTI-PATH DELAY SPREAD DETECTION IN WIDEBAND CDMA SYSTEMS

(75) Inventors: Karim Nassiri Toussi, Belmont, CA (US); Rajaram Subramoniam, San Jose, CA (US); Huoy-Bing Lim, Saratoga, CA (US); Debarag Banerjee, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 892 days.

(21) Appl. No.: 10/651,850

(22) Filed: Aug. 29, 2003

(51) Int. Cl.
*H04L 12/26* (2006.01)

(52) U.S. Cl. ....................................... 370/238; 370/487

(58) Field of Classification Search ................ 370/320, 370/335, 349, 351, 342, 441, 519, 508, 516, 370/248, 252, 253, 237, 238, 487, 490, 493
See application file for complete search history.

(56) References Cited

U.S. PATENT DOCUMENTS 5,448,600 A * 9/1995 Lucas ......................... 370/342
6,865,218 B1 * 3/2005 Sourour ...................... 375/148
2004/0213363 A1 * 10/2004 Bottomley et al. ......... 375/343

* cited by examiner

*Primary Examiner*—Brenda Pham
(74) *Attorney, Agent, or Firm*—Brett A. Hertzberg; Merchant & Gould PC

(57) ABSTRACT

A fast, low-complexity detection scheme for determining the delays and gains of different propagation paths (i.e., multi-paths) of a received WCDMA signal. The method utilizes a continuous pilot channel that is scrambled by an known pseudo-random sequence. The received signal is provided to a multi-path searcher that passes the received signal through a matched filter with a specified number of taps. The matched filter correlates the received signal with the pilot channel. The multi-path gain and delay detection is then performed, and the delays and gains are reported for use in the WCDMA system.

23 Claims, 3 Drawing Sheets

METHOD AND APPARATUS FOR MULTI-PATH DELAY SPREAD DETECTION IN WIDEBAND CDMA SYSTEMS

FIELD OF THE INVENTION

The present invention relates generally to wide-band code division multiple access (WCDMA) systems, and more particularly to multi-path delay spread detection in WCDMA systems.

BACKGROUND OF THE INVENTION

In wideband CDMA and other wireless mobile communications systems, the wireless signal may not take a direct path between the transmitter and receiver. A wireless signal may be propagated and received through multiple paths or rays. The multiple paths are due to reflections and diffractions of the wireless signal. The transmission of the wireless signals across these multiple reflective paths is often referred to as multi-path propagation.

The multi-path effect often results in delayed or advanced versions of the signal being received, and also results in fluctuations in the amplitude and phase in these versions of the received signal. The range of delays between different versions of the same signal received along different paths is referred to as the multi-path delay spread.

DETAILED DESCRIPTION OF THE PREFERRED EMBODIMENT

Figure 1:
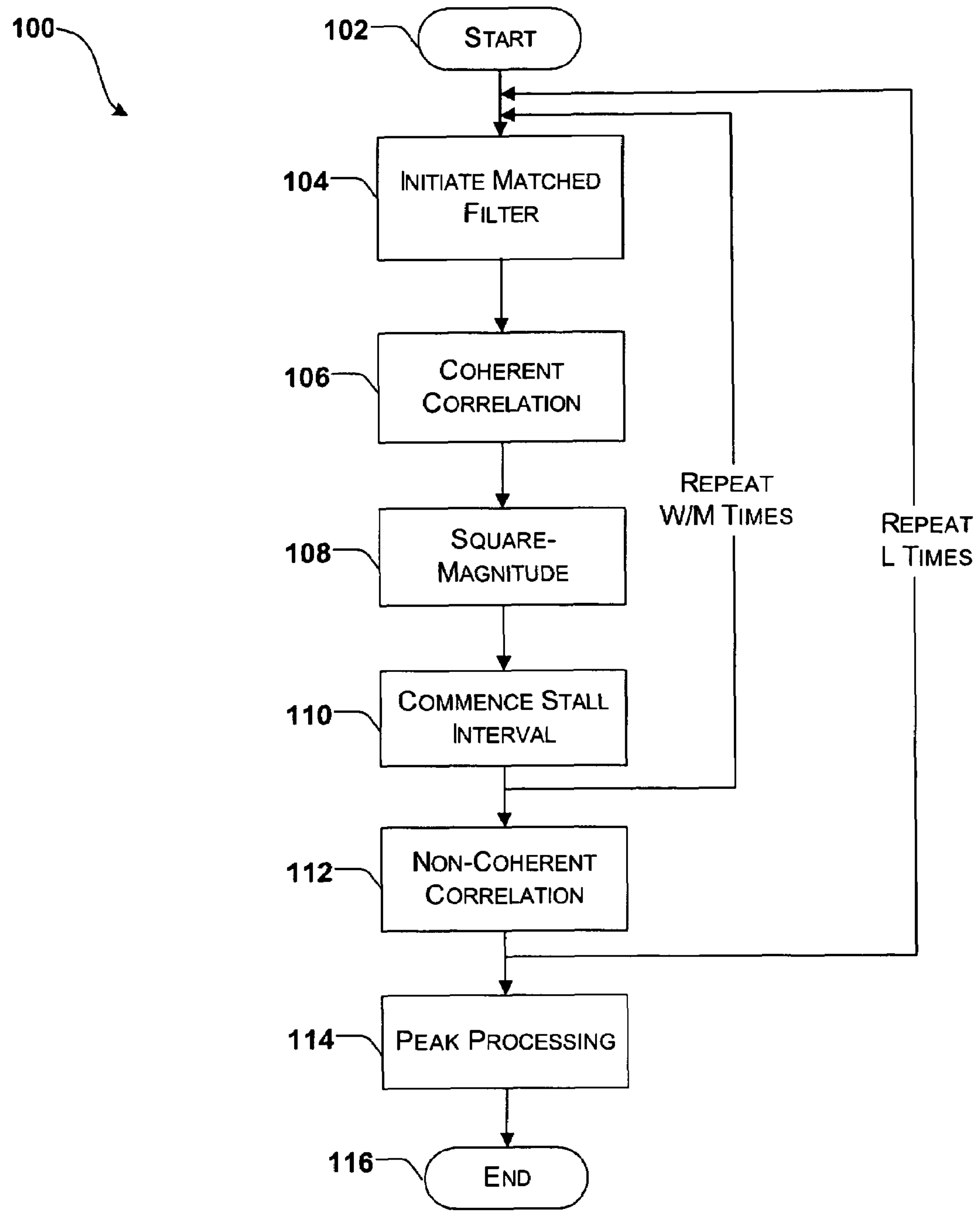
FIG. 1 illustrates an exemplary flow diagram for a multi-path delay spread detection process in accordance with the present invention.

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected, or an indirect connection through one or more passive or active intermediary devices. The term "circuit" means either a single component or a multiplicity of components, either active and/or passive, that are coupled together to provide a desired function. The term "signal" means at least one current, voltage, or data signal. Referring to the drawings, like numbers indicate like parts throughout the views.

The present invention is generally directed towards a fast, low-complexity detection method for determining the delays and gains of different propagation paths (i.e., multi-paths) of a received WCDMA signal. The method utilizes a continuous pilot channel that is scrambled by a known pseudo-random sequence. After digital sampling, the received signal is processed by a multi-path searcher block that passes the received signal through a matched filter with a specified number of taps. The matched filter correlates the received signal with the known pilot channel. The multi-path gain and delay detection is then performed, and the delays and gains are reported for use in the WCDMA system.

According to one aspect of the invention, the detection method may be used to search for multiple base stations in the Monitored Set. In one embodiment, a mobile device monitors up to a maximum of 32 base stations in the Monitored Set, with at least one base station every 800 ms. In some cases, the radio resource control may notify the mobile device of the rough timing of its neighbor cells relative to the serving cell. The timing offset could be in the range of 40, 256, or 2560 chips (i.e., samples). In some cases, this timing information may not be known. If the timing offset of the neighbor cell is known and small (e.g., a maximum of 40 chips), the present invention is used to detect the neighbor cell and the received power for all paths in a ±80 chips (about ±20 μs) search window. If the timing offset is large (e.g., more than 40 chips) or unknown, the present invention is used after the three-stage (two-stage if the Gold Code or downlink scrambling code sequence is known) cell search takes place. The search results are reported back to radio resource control for power measurement and selecting of a new serving cell.

According to another aspect of the present invention, the detection method may also be used for finger assignment of a WCDMA rake receiver. A mobile device may be arranged to search all the base stations in the Active Set. In one embodiment, mobile device monitors up to 6 base stations in the Active Set, within a maximal search window size of ±80 chips. The search results are then used to assign fingers in the WCDMA rake receiver. Accordingly, each multi-path of the rake receiver receiving a signal is synchronized according to delay of the signal on that particular multi-path.

According to yet another aspect of the present invention, the detection method may also be used to search a serving cell while a mobile device is in idle mode. Searching the serving cell may also be part of the wake-up process for a mobile device. The mobile device monitors the serving cell and uses the search results to assign fingers in the Rake receiver. If the measured received power for the serving cell is too small, the mobile device starts the cell-search process to search for a new serving cell.

FIG. 1 illustrates an exemplary flow diagram for a multi-path delay spread detection process in accordance with the present invention. The process starts at block 102, where the received signal is provided to a multi-path searcher that passes the received signal through a matched filter (see FIG. 2) with M taps (e.g., 16 taps). The matched filter correlates the received signal with the pilot channel at different timing offsets, wherein M divides the length of the CDMA pilot symbol (e.g., 256 chips). Processing then proceeds to block 104.

At block 104, the matched filter is initiated to perform correlation of the received signal with the pilot channel at desired timing offsets. A pseudo-random sequence generator (see Gold Code generator with stall control of FIG. 2) generates a pilot channel chip sequence from a given CDMA pilot symbol boundary. The M matched filter tap coefficients are loaded with the conjugate of this pilot channel sequence. The matched filter operates for M chips and the corresponding complex outputs are stored. The pseudo-random sequence generator runs in parallel and synchronous with the matched filter. The M matched filter outputs correspond to M different timing offsets, e.g. 0 to 15. The propagation paths may potentially be subject to these different timing offsets. Processing continues at block 106.

At block 106, the multi-path searcher operates to coherently accumulate another set of outputs with the first set. For the coherent accumulation step, the matched filter tap coefficients are loaded with the conjugate of the next M pilot chips and the corresponding complex outputs are coherently accumulated (i.e. complex addition) to the previously stored results. In one embodiment, transmit diversity may exist (e.g., when the signal is being transmitted by more than one antenna at the base station introducing artificial multi-path distortion). In this embodiment, a second accumulation that matches the transmit diversity pattern is also performed. The coherent accumulation process of block 106 is repeated N/M times, where N corresponds to an integer multiple of CDMA pilot symbols, referred to as the "correlation length". Processing then continues at block 108.

At block 108, the square-magnitudes of the M (e.g., 16) accumulated complex outputs, corresponding to M (e.g., 16) different timing offsets, are calculated and appended to a vector (memory) of length W, where W corresponds to the search window in number of chips (e.g., 160). At this point, the pseudo-random sequence generator has generated N chips. Processing proceeds to block 110.

At block 110, a stall interval is commenced where the matched filter and pseudo-random sequence generator are simultaneously disabled for M chips. Process steps 104, 106, 108, and 110 are then repeated for W/M times before processing proceeds to block 112.

At block 112, the multi-path searcher operates to non-coherently accumulate the square-magnitudes. Process steps 104, 106, 108, 110, and 112 are repeated for L times and the results are added each time to the W-length vector, where L corresponds to a selected number of expected energy components. Processing then moves to block 114.

At block 114, the multi-path searcher implements the peak processing. The values of the W-length vector are examined and compared to a selected threshold or set of thresholds. The P largest peaks among the values of the W-length vector that exceed the threshold are found. These largest peaks are reported, along with the corresponding time-indices, as multi-path gains and delays. Accordingly, the multi-path gains and delays for a received CDMA signal are detected, and once detected, processing moves to block 116 where the process (100) ends.

Figure 2:
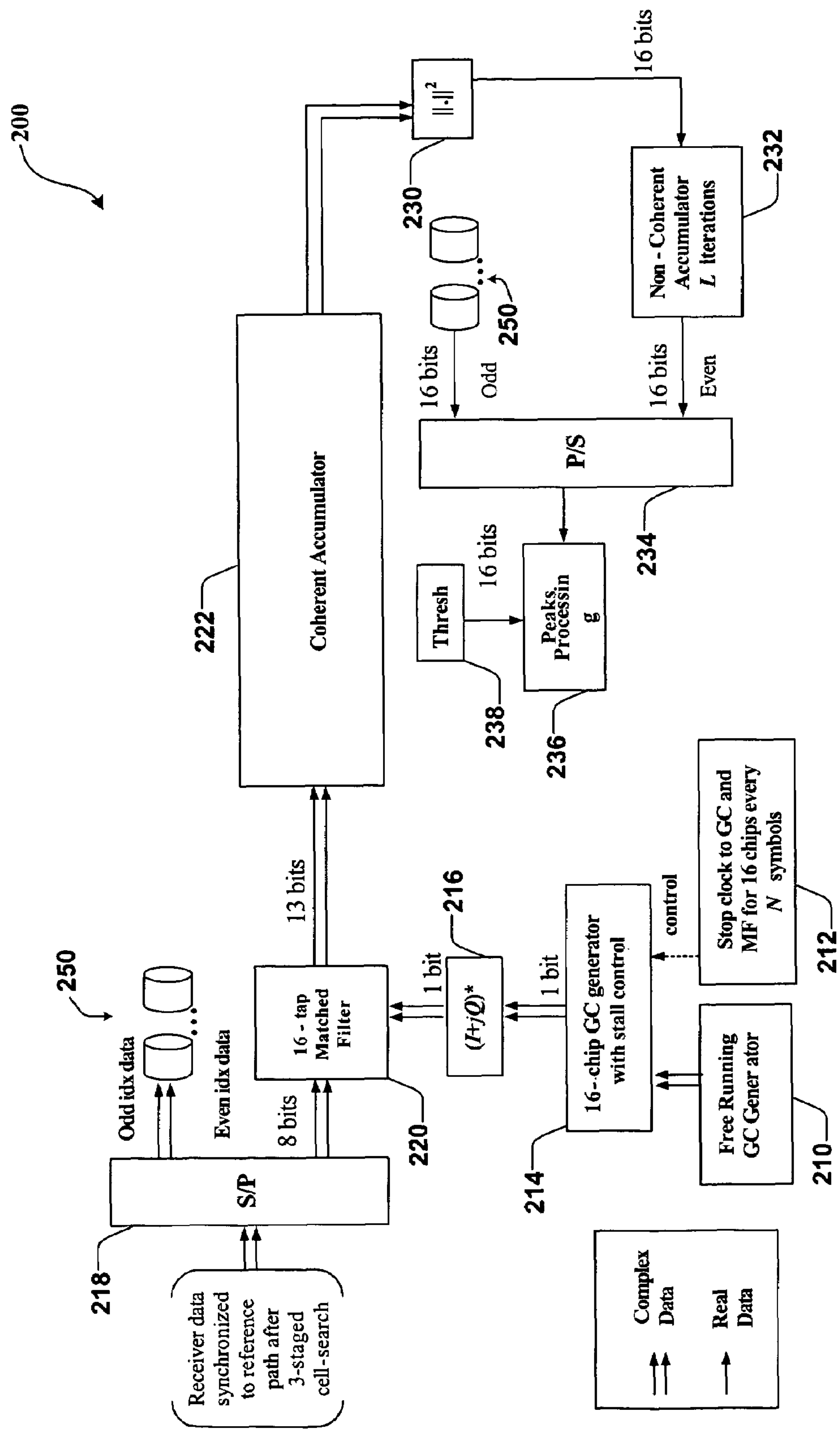
FIG. 2 illustrates an exemplary block/data flow diagram for the multi-path delay spread detection in accordance with the present invention.

FIG. 2 illustrates an exemplary block/data flow diagram for the multi-path delay spread detection in accordance with the present invention. The functional blocks for detection of the multi-path delays include a free running Gold Code (i.e., pseudo-random sequence) generator (210) combined with a stall control (212) to produce a Gold Code generator with stall control (214), a complex conjugate block (216), a serial-to-parallel converter (218), a matched filter (220), coherent accumulator block (222), a magnitude squaring block (230), a non-coherent accumulator block (232), a parallel-to-serial converter (234), a peaks processing block (236), and a threshold block (238).

Receiver data is provided to the serial-to-parallel converter (218). In one embodiment, the receiver data is provided to the serial-to-parallel converter (218) after a 3-stage cell search is completed. The 3-stage cell search refers to a search for a reference path comprised of detecting (in the following sequence) the downlink Primary Synchronization (P-SCH), Secondary Synchronization (S-SCH), and Common Pilot (CPICH) channels that have been transmitted by a WCDMA cell. This process results in the detection of the cell (frame) timing, code-group ID, and downlink scrambling code index. The receiver data is then synchronized to the detected reference path prior to providing the receiver data to the serial-to-parallel converter (218). The data is de-multiplexed into odd and even index data, allowing for greater resolution (e.g., ½-chip) in determining the strength of the signals propagated along the multi-paths. In other embodiments, the separation of data into odd and even indexes is not used. In the example shown, only the functional blocks for the even index data is shown. The functional blocks for the odd index data are not shown, but are substantially the same. It is appreciated that functional blocks for the odd index data are represented by reference (250).

A complex Gold Code sequence (pseudo-random sequence of FIG. 1) of a specified length (e.g., M=16 chips) is provided to the matched filter (220). The Gold Code sequence corresponds to the delayed or advanced version of the reference Gold Code. The reference Gold Code or downlink scrambling code index is detected through the third stage of the cell-search described above. The Gold Code sequence is 16 chips in length and may be "stalled" to correspond to the correct portion of the search window (see FIG. 3). The 16 matched filter tap coefficients are loaded with the conjugate of the Gold Code sequence, as provided by the complex conjugate block (216). The received data chips are shifted into the shift register that implements the matched-filter every clock cycle. The matched filter (220) then operates for M (e.g., 16) chips and the corresponding outputs are stored. The matched filter (220) is then loaded with the next M (e.g., 16) Gold Code chips. The matched filter again operates for M (e.g., 16) chips and the corresponding complex outputs are then coherently accumulated to the previously stored outputs. Described differently, the matched filter is used to correlate the received signal samples with the conjugate of the Gold Code sequence for M (e.g., 16) different timing offsets. The received signal samples are shifted into the matched filter (220) and complex multiplied with the conjugate of the Gold Code sequence.

Following coherent accumulation of the outputs of the filter, the complex results are provided to the magnitude squared block (230) where the square-magnitude of the results of the coherent accumulation is calculated. After each coherent accumulation of M (e.g., 16) correlation results, the matched filter and the Gold Code generator are stalled for M (e.g., 16) chips so that another M (e.g., 16) timing offsets can be examined. This process is repeated W/M times so that all the desired timing offsets in a window of W samples are examined.

Often, the mobile device may be on the move, rather than sitting stationary with respect to the base station transmitting the signal. In this situation, the energy of the multi-path fluctuates with time. Hence, one solution is to average the energy estimation over time, rather than performing a long coherent estimation. This energy averaging process is referred as non-coherent accumulation and is performed by the non-coherent accumulator block (232). The non-coherent accumulation involves appending the square-magnitudes of the results to a vector that matches the length of the search window (e.g., W=160 chips). This process also provides a time diversity gain in the estimate.

The final even-indexed and odd-indexed peak results are serialized through the parallel-to-serial converter (234) and are ready for peak processing. Each peak is compared with a preset threshold. The threshold is calculated by scaling the received signal strength (RSSI) with a constant threshold. The comparison against the threshold results in either peak (path) detection or miss. In one embodiment, since the time-tracking resolution of the Delay Lock Loop (DLL) is ½-chip, the immediate neighbors (±½ chip away) of a detected peak (path) are not considered as a different path. The multi-path gains and delays are those values, which surpass the provided threshold. These values are therefore reported along with their time-indices.

Figure 3:
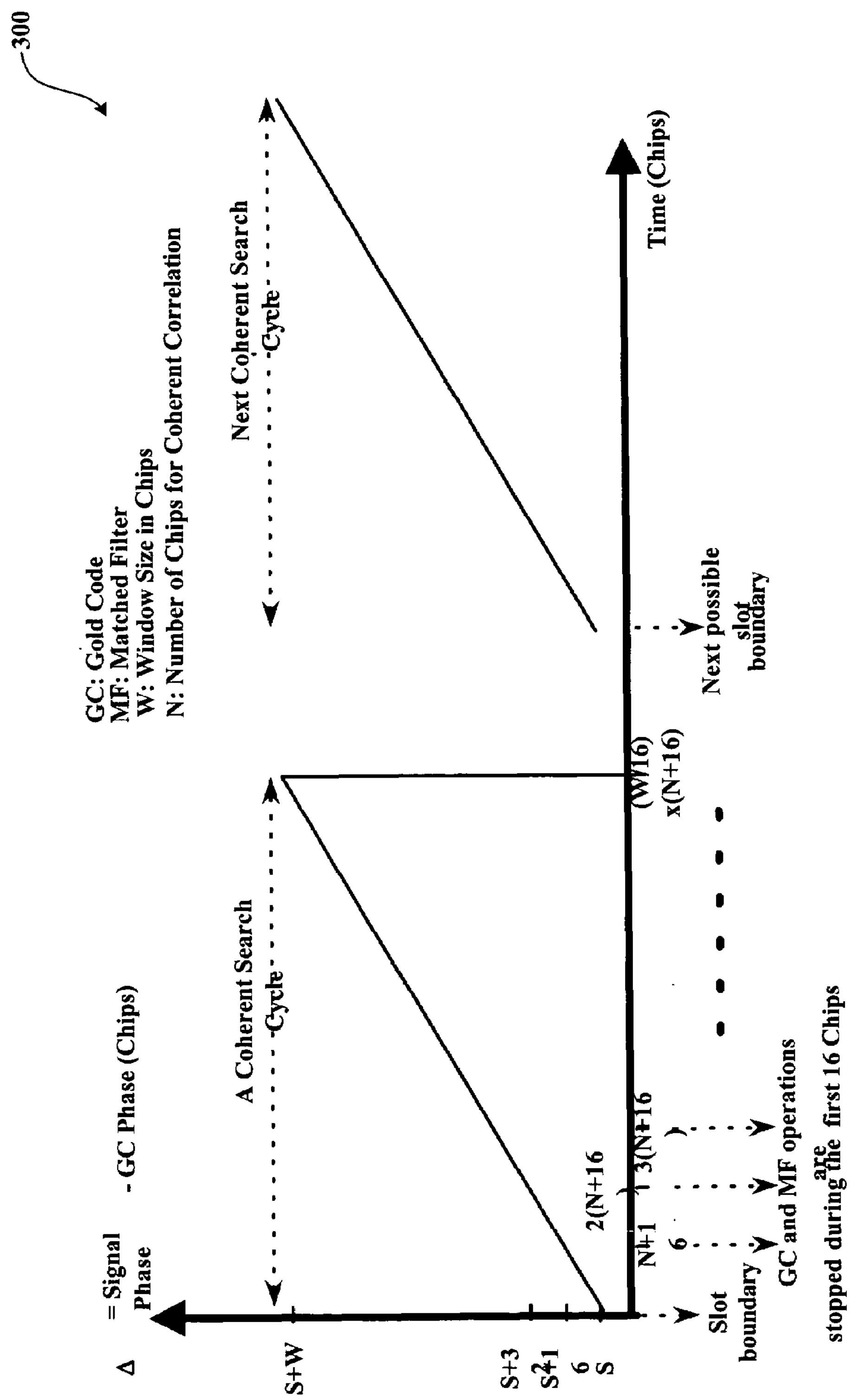
FIG. 3 illustrates an exemplary loading diagram of gold code generator states for the multi-path searcher in accordance with the present invention.

FIG. 3 illustrates an exemplary loading diagram of gold code generator states for the multi-path delay-spread detection in accordance with the present invention. With the size of the search window programmed, the multi-path searcher will start searching for candidates from the smallest index of the window. Note that a candidate with a negative window index implies a path that is early compared to the reference path detected through the Gold Code detection and vice versa. The reference path has an index of zero in the window. On the other hand, a positive indexed candidate is late compared to the reference path. When the second 16 (M) multi-paths are ready for computation, the first "stall" occurs. While data is continuously shifted in, the Gold Code generator and the matched filter operations are stalled for 16 (M) cycles. This results in a lag of 16 (M) chips in the Gold Code phase compared to its previous phase. Sixteen chip cycles will elapse before the next N-symbol coherent correlation begins. It is necessary to stall the matched filter as well in order to ensure that each coherent correlation happens at symbol boundary for detection performance purposes. After 16 (M) chip cycles have passed, the operation of coherent correlation and accumulation of N symbols is repeated for the next 16 (M) timing offsets. In essence, the multi-paths starting from the negative side of the search window are processed first. Sixteen (M) multi-paths are computed after every stalling of the Gold Code generator, moving towards the positive side of the search window, until all multi-paths have been searched.

The final even-indexed and odd-indexed peak results are then serialized and peak processed to discover the gains and delays, as described above.

The multi-path delay spread detection method can be implemented using a combination of hardware and firmware. For example, matched filter and coherent correlation may be implemented in hardware and the non-coherent correlation and the peak processing may be implemented in firmware.

Various embodiments of the invention are possible without departing from the spirit and scope of the invention. For example, the present invention can be used with wireless networks other than WCDMA.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for multi-path searching in a mobile device such that the mobile device detects delays and gains of different propagation paths for a received signal, the method for the mobile device comprising:

correlating data corresponding to a first one of the propagation paths of the received signal with a conjugate of a pilot channel sequence;

repeating the correlation for other propagation paths of the received signal, wherein the other propagation paths correspond to a first set of propagation paths that also includes the first one of the propagation paths;

coherently accumulating results corresponding to the correlation for the first set of propagation paths;

calculating square-magnitudes of the coherently accumulated results corresponding to the first set of propagation paths; and comparing the calculated square-magnitudes of the coherently accumulated results corresponding to the first set of propagation paths to a threshold to identify first search results for the first set of propagation paths from the square-magnitudes of the first set of propagation paths that surpass the threshold, wherein the first search results include corresponding delays and gains for the first set of propagation paths.

2. The method of claim 1, further comprising:

repeating the correlation for a second set of propagation paths;

coherently accumulating results corresponding to the correlation for the second set of propagation paths;

calculating square-magnitudes of the coherently accumulated results corresponding to second set of propagation paths;

non-coherently accumulating the square-magnitudes of the coherently accumulated results corresponding to the first set of propagation paths with the square-magnitudes of the results corresponding to the second set of propagation paths; and comparing the calculated square-magnitudes of the results corresponding to the second set of propagation paths to the threshold to identify second search results for the second set of propagation paths from the square-magnitudes of the second set of propagation paths that surpass the threshold, wherein the second search results include corresponding delays and gains of the second set of propagation paths.

3. The method of claim 2, wherein the calculated square magnitudes of the results corresponding to the first set of propagation paths and the calculated square magnitudes of the results corresponding to the second set of propagation paths are compared to the threshold substantially in the same time interval.

4. The method of claim 2, further comprising stalling the pilot channel sequence for a selected interval of time prior to repeating the correlation for the second set of propagation paths.

5. The method of claim 1, wherein the pilot channel sequence corresponds to a pseudo-random sequence that corresponds to the downlink scrambling code related to a code division multiple access system.

6. The method of claim 1, wherein data for the propagation paths from the first set of propagation paths is demultiplexed into odd index data and even index data prior to correlating data corresponding to the first one the propagation paths of the received signal with the conjugate of the pilot channel sequence.

7. The method of claim 1, wherein correlating data further comprises loading tap coefficients of a matched filter with the conjugate of the pilot channel sequence, wherein the matched filter operates for a selected interval to produce the results of the correlation.

8. The method of claim 1, wherein the calculated square-magnitudes of the coherently accumulated results corresponding to the first set of propagation paths is appended to a vector that is then processed for comparison to the threshold.

9. A method for multi-path searching in a mobile device such that the mobile device detects delays and gains of different propagation paths of a received signal, the method for the mobile device comprising:

generating a pilot channel chip sequence starting from a pilot symbol boundary;

loading tap coefficients of a matched filter with a conjugate of the pilot channel sequence;

operating the matched filter to correlate a first set of data with the conjugate of the pilot channel sequence to produce a first set of results corresponding to the first set of data, wherein the first set of data is associated with propagation paths of the received signal;

operating the matched filter to correlate a second set of data with the conjugate of the pilot channel sequence to produce a second set of results corresponding to the second set of data, wherein the second set of data is associated with propagation paths for the received signal;

coherently adding the first set of results with the second set of results to provide a first coherent accumulation;

calculating a first set of square-magnitudes for the first set of results and the second set of results with the first coherent accumulation, wherein the calculated first set of square magnitudes each have a corresponding time indexed location; and comparing the calculated first set of square-magnitudes to a threshold to identify search results, wherein the time-indexed locations of the calculated first set of square-magnitudes that surpass the threshold identify the delays and gains of the first and second sets of data associated with the propagation paths.

10. The method of claim 9, further comprising:

stalling the pilot channel chip sequence for a selected interval of time;

generating another pilot channel chip sequence starting from another pilot symbol boundary;

loading tap coefficients of the matched filter with a conjugate of the other pilot channel sequence;

operating the matched filter to correlate a third set of data with the conjugate of the other pilot channel sequence to produce a third set of results corresponding to the third set of data, wherein the third set of data is associated with propagation paths for the received signal;

operating the matched filter to correlate a fourth set of data with the conjugate of the other pilot channel sequence to produce a fourth set of results corresponding to the fourth set of data, wherein the fourth set of data is associated with propagation paths of the received signal;

coherently adding the third set of results with the fourth set of results to provide a second coherent accumulation;

calculating a second set of square-magnitudes for the third set of results and the fourth set of results with the second coherent accumulation wherein the second set of square magnitudes each have a corresponding time indexed location;

non-coherently adding the first set of square magnitudes to the second set of square magnitudes; and comparing the calculated second set of square-magnitudes to the threshold along with the calculated first set of square-magnitudes to identify search results, wherein the time-indexed locations of the calculated first set and second set of square-magnitudes that surpass the threshold identify the delays and gains of the first, second, third, and fourth sets of data associated with the propagation paths.

11. The method of claim 9, wherein the pilot channel sequence corresponds to a pseudo-random sequence that corresponds to the downlink scrambling code related to a code division multiple access system.

12. The method of claim 9, wherein the first set of data associated with the propagation paths is de-multiplexed into odd index data and even index data prior to operating the matched filter.

13. The method of claim 9, wherein the calculated first set of square-magnitudes and the calculated second set of square-magnitudes are appended to a vector that is then processed for comparison to the threshold.

14. An apparatus for multi-path searching such that the apparatus detects delays and gains of different propagation paths for a received signal, comprising:

a means for correlating data corresponding to a first one of the propagation paths of the received signal with a conjugate of a pilot channel sequence;

a means for repeating the correlation for other propagation paths of the received signal, wherein the other propagation paths correspond to a first set of propagation paths that also includes the first one of the propagation paths;

a means for coherently accumulating results from the correlation of the first set of propagation paths;

a means for calculating the square-magnitudes of the coherently accumulated results from the correlation of the first set of propagation paths; and a means for comparing the calculated square-magnitudes of the coherently accumulated results from the correlation of the first set of propagation paths to a threshold and identifying search results for the first set of propagation paths from the calculated square-magnitudes of the coherently accumulated results from the correlation of the first set of propagation paths that surpass the threshold, wherein the search results for the first set of propagation paths identify delays and gains of the first set of propagation paths.

15. The apparatus of claim 14, further comprising:

a means for repeating the correlation for a second set of propagation paths;

a means for coherently accumulating results from the correlation of the second set of propagation paths;

a means for calculating the square-magnitudes of the coherently accumulated results from the correlation of the second set of propagation paths;

a means for non-coherently accumulating the calculated square-magnitudes of the coherently accumulated results from the correlation of the first set of propagation paths with the calculated square-magnitudes of the coherently accumulated results from the correlation of the second set of propagation paths; and a means for comparing the calculated square-magnitudes of the coherently accumulated results from the correlation of the second set of propagation paths to the threshold and identifying search results for the second set of propagation paths from the calculated square-magnitudes of the coherently accumulated results from the correlation of the second set of propagation paths that surpass the threshold, wherein the search results for the second set of propagation paths identify delays and gains of the second set of propagation paths.

16. The apparatus of claim 15, wherein the calculated square magnitudes of the coherently accumulated results from the correlation of the first set of propagation paths and the calculated square magnitudes of the coherently accumulated results from the correlation of the second set of propagation paths are compared to the threshold substantially in the same time interval.

17. The apparatus of claim 14, further comprising a means for stalling the pilot channel sequence for a selected interval of time prior to repeating the correlation for the second set of propagation paths.

18. The apparatus of claim 14, further comprising a means for de-multiplexing the data corresponding to the first one the propagation paths into odd index data and even index data prior to correlating data corresponding to the first one the propagation paths of the received signal with the conjugate of the pilot channel sequence.

19. The apparatus of claim 14, wherein the means for correlating data further comprises a means for loading tap coefficients of a matched filter with the conjugate of the pilot channel sequence, wherein the matched filter operates for a selected interval to produce the results of the correlation.

20. The apparatus of claim 14, wherein the calculated square-magnitudes of the coherently accumulated results from the correlation of the first set of propagation paths is appended to a vector that is then processed for comparison to the threshold.

21. The apparatus of claim 14, further comprising a radio resource control, wherein the radio resource control is arranged to process the search results and assign fingers in a rake receiver in response thereto.

22. The apparatus of claim 14, further comprising a radio resource control, wherein the radio resource control is arranged to process the search results and select a new serving cell in response thereto.

23. The apparatus of claim 14, further comprising a radio resource control, wherein the radio resource control is arranged to process the search results and determine received power in response thereto.

* * * * *